United States Patent
Nazarian et al.

(10) Patent No.: US 10,493,354 B2
(45) Date of Patent: Dec. 3, 2019

(54) DIGITALLY CONTROLLED VARIABLE STIFFNESS SKI, SNOWBOARD, AND BOOTS SYSTEM

(71) Applicants: Ara Nazarian, Wellesley, MA (US);
Edward K. Rodriguez, Medfield, MA (US)

(72) Inventors: Ara Nazarian, Wellesley, MA (US);
Edward K. Rodriguez, Medfield, MA (US)

( * ) Notice: Subject to any disclaimer, the term of this patent is extended or adjusted under 35 U.S.C. 154(b) by 200 days.

(21) Appl. No.: 15/409,745

(22) Filed: Jan. 19, 2017

(65) Prior Publication Data
US 2017/0203192 A1     Jul. 20, 2017

Related U.S. Application Data

(60) Provisional application No. 62/280,209, filed on Jan. 19, 2016.

(51) Int. Cl.
| | |
|---|---|
| A63C 5/07 | (2006.01) |
| F03G 7/06 | (2006.01) |
| A63C 13/00 | (2006.01) |
| A63C 5/03 | (2006.01) |

(52) U.S. Cl.
CPC .............. *A63C 5/07* (2013.01); *A63C 13/00* (2013.01); *F03G 7/06* (2013.01); *F03G 7/065* (2013.01); *A63C 5/03* (2013.01); *A63C 2203/12* (2013.01)

(58) Field of Classification Search
CPC ... F03G 7/06; F03G 7/065; A63C 5/07; A63C 13/00; A63C 2203/12; A63C 5/03
USPC ................ 60/527–529; 310/306, 307
See application file for complete search history.

(56) References Cited

U.S. PATENT DOCUMENTS

| | | | |
|---|---|---|---|
| 4,864,860 A * | 9/1989 | Manseth | G01P 3/50 73/490 |
| 2003/0155740 A1* | 8/2003 | Lammer | A63C 5/075 280/602 |
| 2012/0276309 A1* | 11/2012 | Failing | G06F 17/50 428/34.1 |
| 2013/0309089 A1* | 11/2013 | Madsen | B64C 3/185 416/1 |
| 2013/0341127 A1 | 12/2013 | Mann | |

OTHER PUBLICATIONS

"U.S. Appl. No. 15/804,938, Non Final Office Action dated Jan. 11, 2019", 13 pgs.
"U.S. Appl. No. 15/804,938, Response filed May 13, 2019 to Non Final Office Action dated Jan. 11, 2019", 12 pgs.

* cited by examiner

*Primary Examiner* — Mark A Laurenzi
*Assistant Examiner* — Mickey H France
(74) *Attorney, Agent, or Firm* — Schwegman Lundberg & Woessner, P.A.

(57) ABSTRACT

A system, method and apparatus for a digitally Controlled Variable Stiffness item of athletic equipment, such as a Ski, Snowboard, and Boots. A core of thermally responsive metal alloy, such as Nitinol is disposed within the athletic equipment. A thermal control module and controller permit the athlete to program the athletic equipment to a desired stiffness parameter. The controller may include an app operable via a mobile computing device in communication with the thermal control module.

18 Claims, 7 Drawing Sheets

DIGITALLY CONTROLLED VARIABLE STIFFNESS SKI, SNOWBOARD, AND BOOTS SYSTEM

CROSS-REFERENCE TO RELATED APPLICATIONS

EFS ID: 24654352
Application No.: 62280209
Confirmation No: 1621
Receipt Date: Jan. 19, 2016

BACKGROUND OF THE INVENTION

The present invention relates to sporting equipment performance based stiffness parameters, and more particularly to modifying the stiffness parameters in a piece of sporting equipment, such as skis and snowboards.

Existing skis and snowboards are designed for specific skiing conditions (groomer, powder, off-piste, and the like) that provide better control for each skiing/snowboarding environment. This is accomplished by changes in the physical shape of the skis, the manufacturing materials and binding/boot configurations among other factors. Once manufactured, except for minor adjustments, such as waxing or binding adjustments, the performance characteristics of existing skis or snowboard are mostly fixed. As a result, none of the existing categories allow a skier/snowboarder to modify the stiffness of the ski/snowboard to adapt to changing snow conditions during the day. According to present systems and methods, various sets of skis are needed for different ski conditions or level of expertise.

For example, when a skier may start on cold and hard surface slopes, and weather conditions gradually change throughout the day to create softer or slush type snow. In addition to changing weather conditions, the snow conditions may also be affected by skier density, whereby the more skiers/boarders slide on the snow during the day, the more the snow conditions may be affected. With fixed performance characteristics built into the skis, snowboard, boots, and bindings, it has not been possible to make changes to the same equipment to accommodate changing snow conditions.

If skis are left outside, their core, top surface and bottom surface temperatures are very similar to the ambient temperature. If skis are maintained indoors the night before prior to skiing, the core, top surface and bottom surface temperatures adjust to the outside ambient temperature in 20 to 25 minutes.

As can be seen, there is a need for a more responsive ski/snowboard/boot system for the high performance and recreational skier that will allow the user to further enjoy their sport and potentially provide them with better protection against injury.

BRIEF SUMMARY OF THE INVENTION

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a system, method, and apparatus for an athlete to variably control the stiffness parameters of a piece of athletic equipment to select a desired performance characteristic of the equipment based on the stiffness parameter.

By way of example, the system provides a skier or a snowboarder the ability to have a single pair of skis or snowboard that have variable controllable stiffness properties in order to adapt the equipment to different snow conditions and skiing/snowboarding styles. With a set of skis, snowboard, or boots according to the present invention, a skier/snowboarder may adjust the stiffness of his or her skis, snowboard, and/or boots based on the skiing or snowboarding conditions, throughout the day, without the need to change their skis/snowboard. This will enable the skier or the snowboarder to have better control and potentially reduce risk of injury.

An item of athletic equipment, such as a ski or snowboard, according to aspects of the present invention may be seen in reference to the drawings. For purposes of non-limiting illustration, the drawings of FIGS. 1 and 2 generally depict the body of a ski or snowboard, and the aspects disclosed are equally applicable to each. For ease of description, an embodiment of a ski will be described, it being understood that the technology disclosed herein finds applicability to a pair of skis, a snowboard, boots, and bindings, and other articles of athletic equipment.

Figure 1:
FIG. 1 is a side elevation view of an embodiment of a ski or snowboard.

As will be appreciated from the side elevational view of FIG. 1, a ski comprises an elongate body, having a front end and a back end. The ends may be formed with an upturned tip or tail, respectively. The elongate body has a substantially flat surface along its longitudinal length, with a slightly arched upward curvature intermediate the ends. A binding may be mounted proximate to a midpoint of the ski. The binding serves to releasably attach a boot to the ski.

Figure 2:
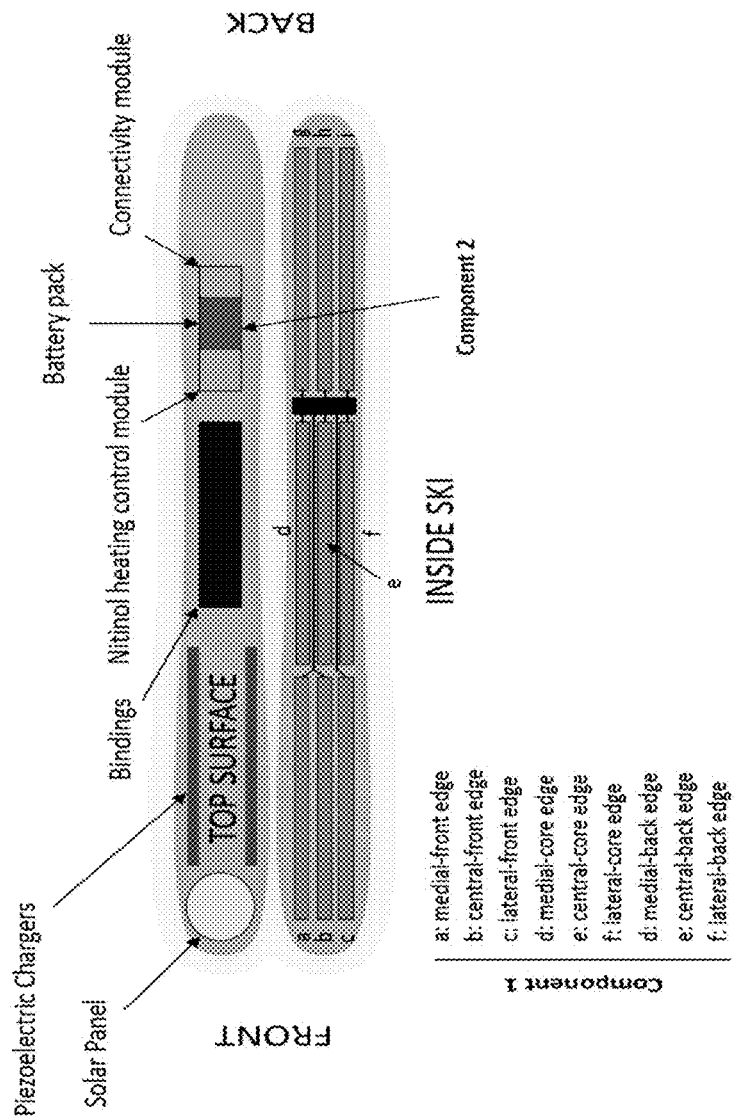
FIG. 2 is a top plan view of a ski or snowboard.

Referring now to the top surface view shown in FIG. 2, a battery pack and control unit may be mounted to an aft portion of the ski, or be attached to the back of the boots, to provide a power source and control unit for operation of the system components and circuitry. An upper surface of the ski may be provided with a solar panel, preferably located near the tip of the ski, which may use solar radiation to produce an electric charge. The ski may also be provided with at least one strip of piezoelectric material, whereby the flexing of the ski, in use, will produce an electric charge. The circuitry may include a battery-charging module that receives and regulates the electric charges to recharge the battery back and extend the battery life of the system. The battery pack may be any suitable battery source, and is preferably a lithium ion battery. The circuitry will also include a heating control module and a connectivity module.

Figure 3:
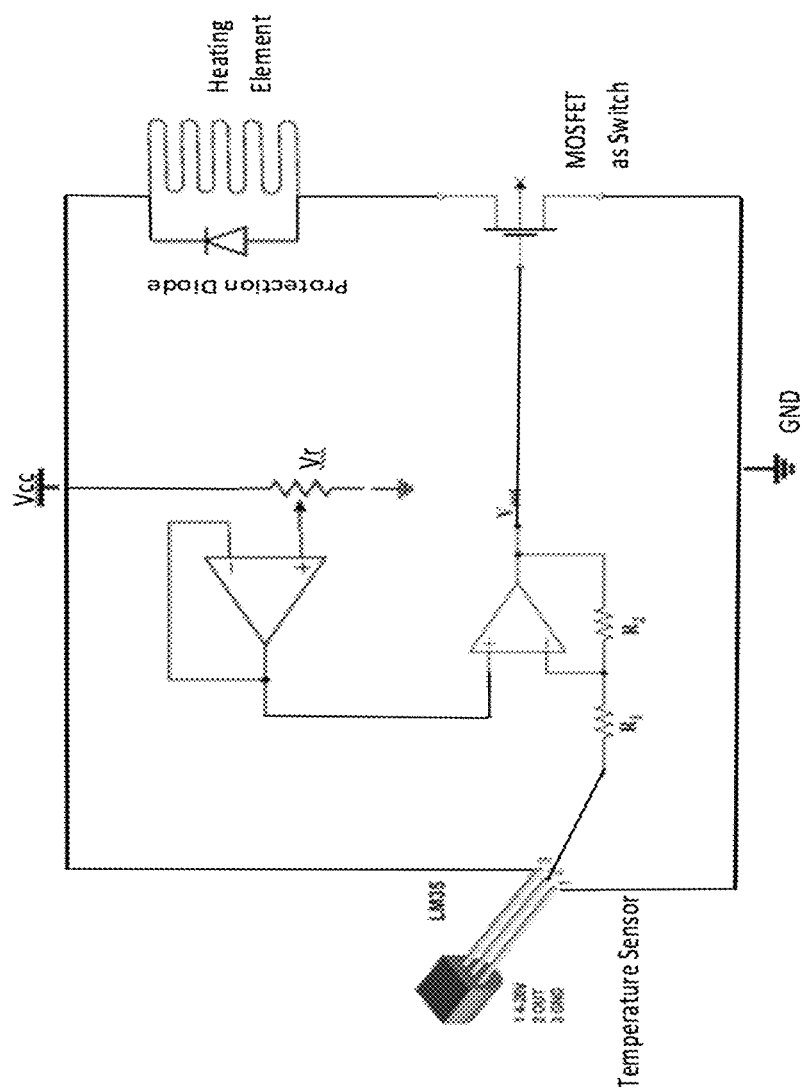
FIG. 3 is an electric circuit schematic of the ski board's heating system

FIG. 3 outlines the control unit of the system. The description is not to be taken in a limiting sense, as it describes one of the methods to control the system. The first stage of the circuit is a temperature sensor (LM35) used to constantly monitor the temperature of the ski board. The output of the sensor is electric voltage linearly dependent on the board temperature. The second stage of the circuit is for comparison of the measured voltage (measured temperature) from the sensor with the adjustable reference voltage. The reference voltage can be precisely adjusted to desired level using the resistor Vr. The difference between the measured voltage and the reference voltage will set the voltage at the gate of MOSFET to high which results in current flow through the heating element and eventually heating up the ski board. At the same time the temperature sensor will monitor the temperature increase in the board and increasing the sensor output voltage accordingly. The MOSFET will stay on as long as there is voltage difference and once the voltage level from the sensor reaches the reference voltage, the MOSFET will be turned off which stops current flow through the element. The power supply for the circuit is 12v, which can heat up the board for 2-3 hours. The heating element is made of Nichrome wire, which has well defined resistance and thermal property.

The heating element to increase the temperature of ski board will be Nichrome wire or another option. These heating elements have well defined resistance and derived current at different temperatures based on the measurement done in different conditions.

There are different wires based on the wire Gauge value that can be selected for various application. Using a typical rechargeable battery (http://www.dhgate.com/product/the-large-capacity-rechargeable-lithium-batter/204392339.html), which is 12v and 7500 mAh, the battery life time (in hour) can be calculated according to this formula:

$$\text{Battery Life} = \frac{\text{Battery Capacity in Mili amps per hour}}{\text{Load Current in mili amps}} \times 0.70$$

For the Ski board we would like to have a temperature gradient of aprioximately 10°. Assuming we use 24 inch Nichrome wires with Gauge size of 26, in order to increase the temperature from 32° F. to 42° F., we have to derive 0.36 A current with 12v source. With a typical battery, the battery life time would be approximately (12v and 7500 mAh)

$$\text{Battery Life} = \frac{7500}{360} \times 0.70 = 14.5 \text{ hours}$$

The battery will preferably be removable and may be incorporated into the binding section for the skis attached to the back of the boots, or just aft of the binding section. The battery may be chargeable via a USB cable connectable to any USB power source or by any other DC V source, such as the 12 V DC source of a motor vehicle. As indicated, the battery's life may be extended during skiing/riding by the optional solar arrays or piezoelectric charge elements.

As seen in reference to the inside view of the ski, the elongated body comprises a plurality of variable stiffness core elements disposed within the body of the ski, which may be arranged according to zones or regions. The cores are formed using a shape memory alloy, preferably an alloy of nickel and titanium (Nitinol), which are integrally formed within the ski body. The cores may be disposed replacing the metal (mostly Titanal) core used in skis for increased stiffness and durability, as part of a torsion box for higher end skis/snowboards, or as a layer in lower end skis/snowboards.

When the Nitinol core is heated, its properties induce a phase change from its softer, hyper elastic, martensitic phase to the more rigid austenitic phase. This change in phase of the memory metal alloy cores will thus modify the stiffness profile of the skis at various parts of such equipment, so that the ski may be tuned to respond to changes in terrain, ski conditions, snow quality, or expected performance.

By way of non-limiting example, the core elements may include a medial front edge core, a central front edge core, a lateral front edge core, a medial core edge, a central core edge, a lateral core edge, a medial back edge core, a central back edge core, and a lateral back edge core. A simplified version may be offered, where there are 2 front and back or 3 front, middle, back core elements used in the design. The arrangement and configuration of the cores within the equipment may be influenced by the structural properties of the other components forming the ski body.

It is possible to embed two layers of core elements at the top and bottom of the ski/snowboard for increased stiffness and variability of the stiffness. This approach will allow for increase stiffness control of top and bottom core elements at various positions along the length and width of the ski/snowboard.

The stiffness control of the individual core materials is modulated and regulated by activating a battery powered heating element, such as coil or mesh that is built into the ski. The heating element is positioned adjacent to the Nitinol layer to heat the Nitinol and induce its phase change. The heating elements are operatively connected to the heating control module so as to maintain the desired temperature corresponding to the desired selected stiffness of the ski, by region or zone. The heating control module circuitry may also include temperature sensors embedded in the ski to provide feedback to the heating control module for regulating the desired temperature of one or more of the cores. The shape memory components will have a heating element adjacent to them that can provide a rapid temperature rise adjustment of the element and therefore increase the stiffness of the equipment.

The ski boots may also be constructed with a Nitinol mesh lining and a heating mesh between an external shell and an inner foam lining of the boot, and may connect to the battery and heating control components adjacent to the bindings (with a non-restrictive connection that will not affect ski release mechanisms based on the DIN settings). Heating of the boot heating mesh element may also be activated by the remote controller system or the app.

As previously indicated, the described system and the Nitinol based cores can also be used to produce other useful sporting equipment where spring action is used and adjustable stiffness is a desirable attribute. Examples include diving boards, bats, archery equipment and protective equipment for all sports, where a change is stiffness upon contact/activation will provide additional protection to the athlete.

Figure 4:
FIG. 4 is a screen for a mobile device controller and an app icon.

Control of the core stiffness within the system may be accomplished digitally by use of a remote controller that may be an independent unit or part of an existing communication system such as an application ("app") in a cell phone or other mobile computing device, such as a wristband that works in conjunction with a smart phone and app for ease of access. An example of a controller app user interface (UI) is shown in reference to FIGS. 4 and 5. The controller allows the athlete to set the stiffness profile of the different parts of the equipment, such as skis or snowboard. The stiffness profile may then be communicated to the communications module attached to the ski, through a wireless communication, such as blue tooth, where the communications module will convey signals to activate specific areas of the core to adjust the stiffness of the ski/snowboard as desired.

Figure 5:
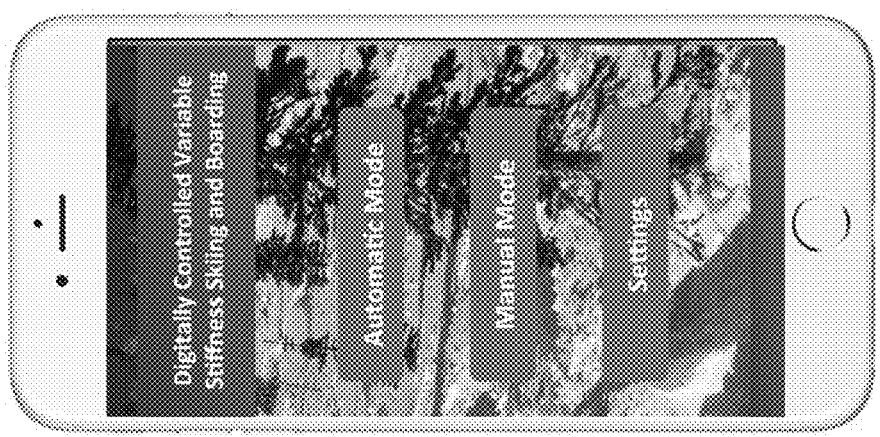
FIG. 5 is a representative screen of an application UI for controlling the system.

As shown in reference to FIG. 5, the controller or app may allow the skier to either manually or automatically set the stiffness profile of the different parts of the skis, such as its front mid-line core, a central mid-line core, a rear mid-line core, front inside edge, front outside edge, back inside edge, and a back outside edge. A manual mode will allow the skier to adjust the stiffness of each one of the stiffness elements cores of the skis based on the user's experience and preference.

An automatic mode may query the skier for the input of temperature, ski conditions, piste condition, and skiing style preferences, and will automatically adjust the stiffness of the different cores based on pre-programmed options. The stiffness profile will then be communicated to the communications module and heating module, specific heating elements on the Nitinol cores may be controlled to modify the stiffness profile as desired and selected.

Using shape memory alloys as part of the ski/snowboard core and/or shape memory alloys as a mesh in the boots, the skier or snowboarder can adjust the stiffness of these materials using the app on his/her smart phone through a Bluetooth connection or other remote system. Stiffness control of these materials is modulated by activating a lithium battery powered heating coil built into the ski and adjacent to the Nitinol layer to heat the Nitinol and induce phase change. This change in phase of the memory metal alloy will thus modify the stiffness profile of the skis, snowboard, or the boot at various parts of such equipment to respond to changes in terrain, ski conditions, snow quality, or expected performance parameters. The boot system will work in a similar way and may share the same power source as the skis/snowboard or have its own power source.

The approach presented here provides a revolutionary use of advanced materials and control technology to change the stiffness profile of a single set of skis/snowboard/boots during use, a feature that is not currently available in any existing product. The present invention provides a significant jump in the ability to design and manufacture a more responsive ski/snowboard/boot for the high performance and recreational skier that will allow the user to further enjoy their sport and potentially provide him/her with better protection against injury.

Currently, bending stiffness of a typical ski and a ski with embedded nitinol sheets has been compared in different situations. To study the effects of embedded nitinol sheet, a modern alpine ski is utilized. Finite element (FE) analysis is conducted to calculate bending stiffness of ski in different situations by ABAQUS software (ABAQUS version 6.13-2, Simulia, Providence, R.I., USA).

Figure 6:
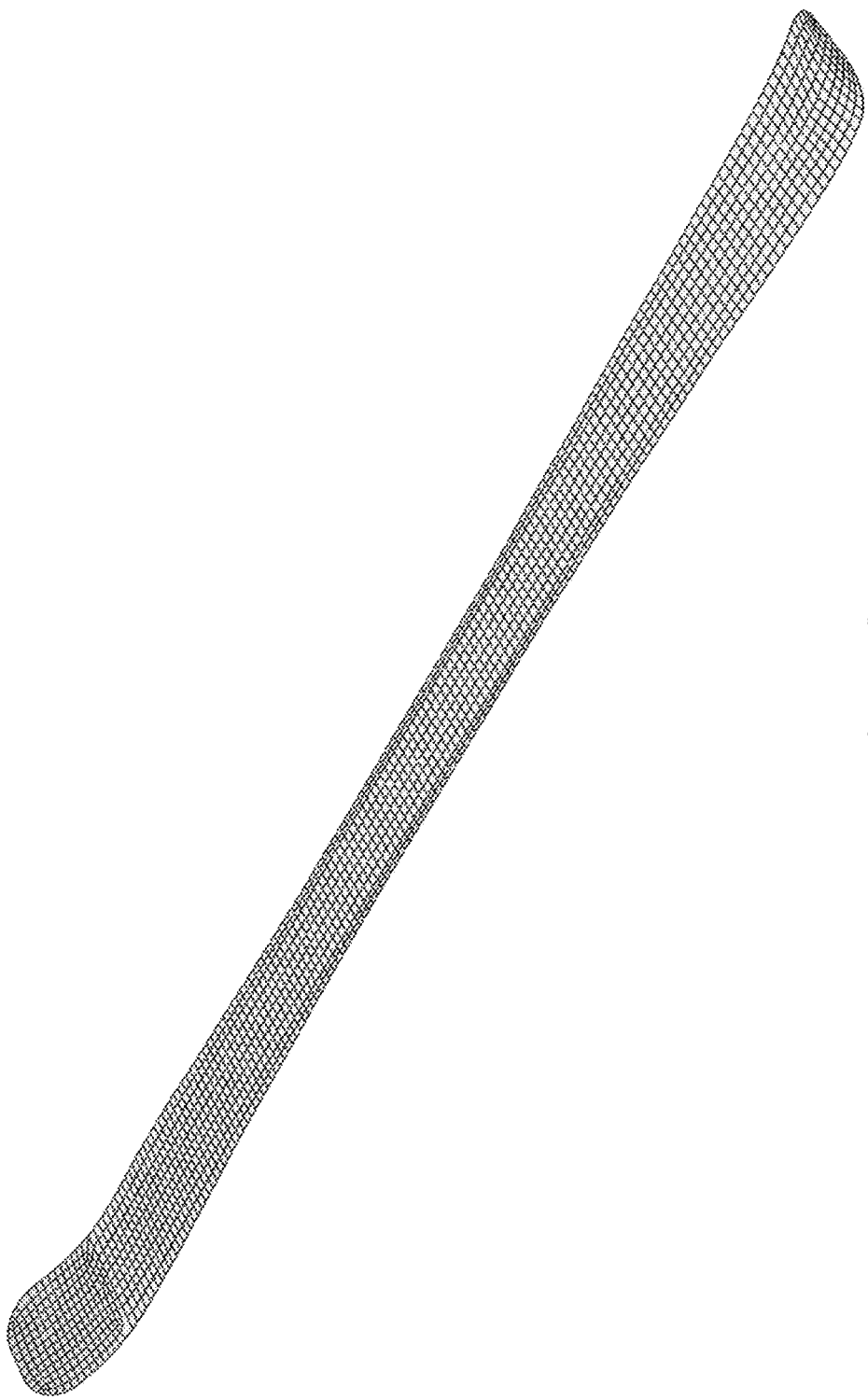
FIG. 6 shows the base geometry and mesh for composite layers.

For geometry and mesh of the above-mentioned ski, we utilize a pre-developed ski model by David Scott Grant (FIG. 6) [1]. Briefly, fourteen different layers with various material properties and orientations are composited on the base geometry through composite layups. Also, we included nitinol sheets at the top and bottom of the composite structure of the model. Composite layers properties are presented in Table 1. Material properties of each material can be found in Table 2. Depending on nitinol sheet temperature, there will be two different material properties for it. In meshing process, element type of the base in ABAQUS is S4r, a 4-node element for curved shell.

TABLE 1

Composite Layups properties

| Layer | Material | Thickness (inch) | Rotation Angle | Integration Points |
|---|---|---|---|---|
| 1 | Nitinol | 0.015 | 0 | 3 |
| 2 | P-Tex | 0.06125 | 0 | 3 |
| 3 | Fiberglass | 0.011 | 0 | 3 |
| 4 | Fiberglass | 0.011 | 45 | 3 |
| 5 | Fiberglass | 0.011 | −45 | 3 |
| 6 | Poplar Wood | 0.06125 | 0 | 3 |
| 7 | Poplar Wood | 0.06125 | 0 | 3 |
| 8 | Poplar Wood | 0.06125 | 0 | 3 |
| 9 | Poplar Wood | 0.06125 | 0 | 3 |
| 10 | Poplar Wood | 0.06125 | 0 | 3 |
| 11 | Fiberglass | 0.011 | 0 | 3 |
| 12 | Fiberglass | 0.011 | 45 | 3 |
| 13 | Fiberglass | 0.011 | −45 | 3 |
| 14 | Basalt Ply | 0.011 | 0 | 3 |
| 15 | NYLON | 0.02 | 0 | 3 |
| 16 | Nitinol | 0.015 | 0 | 3 |

TABLE 2

Material properties of materials utilized in ski composite [1]

| Material | E (psi) | U | E11 (psi) | E22 (psi) | U12 | G12 (psi) | G13 (psi) | G23 (psi) |
|---|---|---|---|---|---|---|---|---|
| Poplar Wood | | | 1738910 | 159980 | 0.318 | 130418 | 130418 | 19128 |
| Fiberglass | | | 6225300 | 1123462 | 0.2098 | 478798 | 478798 | 478798 |
| Basalt Ply | | | 8390950 | 1619352 | 0.2384 | 629914 | 629914 | 629914 |
| P-Tex | 87023 | 0.46 | | | | | | |
| Nylon | 377098 | 0.41 | | | | | | |
| Nitinol in low temperature | 3336000 | 0.33 | | | | | | |
| Nitinol in high temperature | 11603000 | 0.33 | | | | | | |

Figure 7:
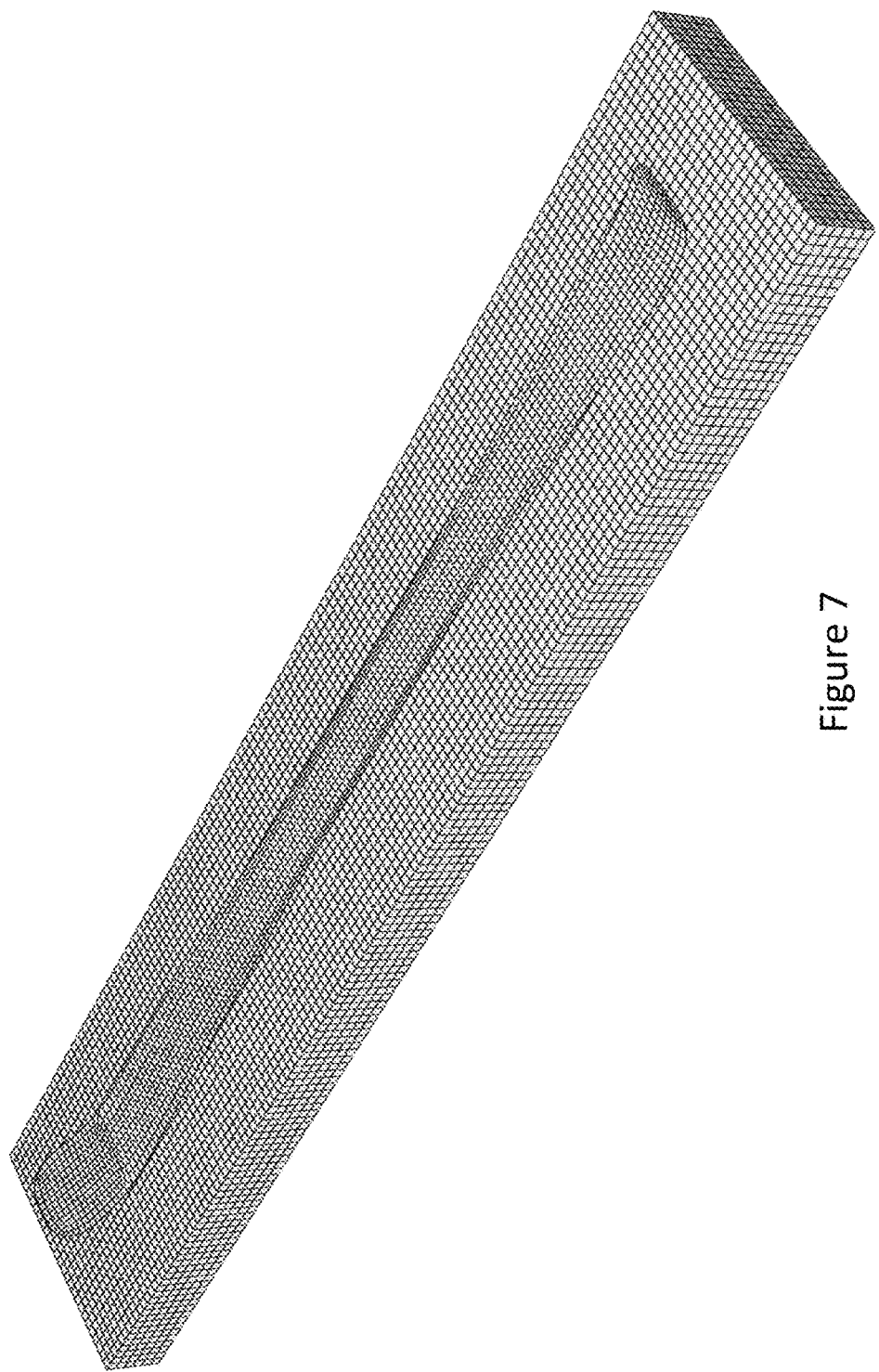
FIG. 7 shows the modeling of ski on snow bulk.

To model actual skiing in different positions with corresponding loading conditions and carving angles, we have also modeled a bulk of snow with 3 in thickness at the bottom of ski (FIG. 7). Material properties of snow are different regarding to the type of snow (Table 3) [2]. Element type of snow in ABAQUS is C3D8R, which is an 8-node linear brick.

TABLE 3

Material properties of different snow

| Material | E (psi) | U |
|---|---|---|
| Fresh Snow | 145 | 0.05 |
| Compressed Snow | 14500 | 0.25 |

Figure 8:
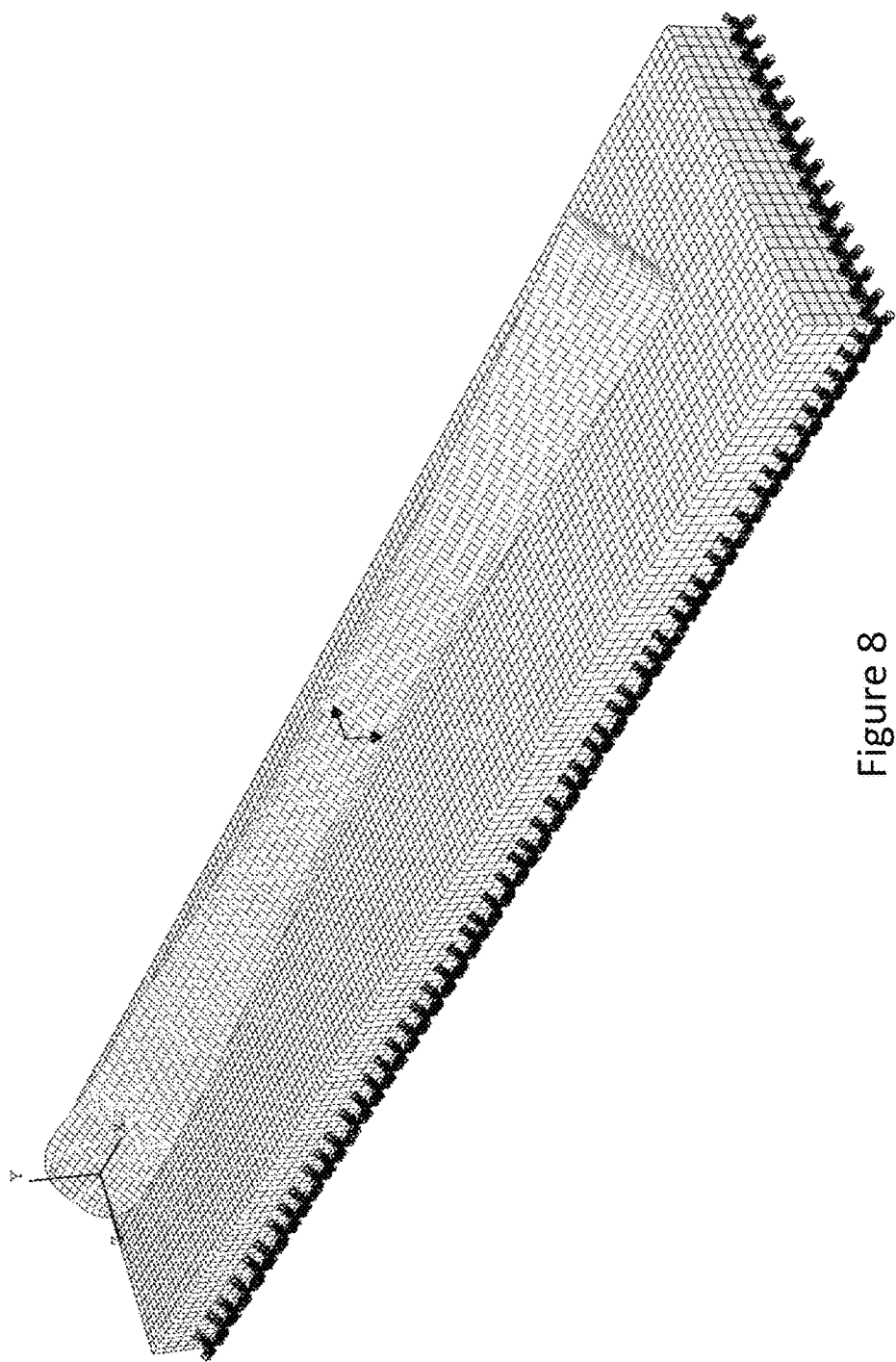
FIG. 8 shows the boundary and loading conditions.

For loading and boundary conditions, the bottom of snow bulk is fixed. A general contact is defined between the bottom of ski and top of snow bulk. We consider three different carving angles: 0°, 20° and 40°. Needless to say, carving angle helps the skier to turn and maneuver quickly. Therefore, different carving angles lead to different loading conditions (Table 4 & FIG. 8). We studied the 4 bending behavior of the ski on two snow configurations. In soft snow configuration, there is 1 inch of fresh snow on the top of 2 inch compressed snow, while in hard snow configuration there is 3 inch of hard snow.

TABLE 4

Loading Conditions

| Carving Angle (°) | Radius of Turn (inch) | Velocity (inch/sec) | Vertical Weight (lb) | Horizontal Force (lb) |
|---|---|---|---|---|
| 0 | ∞ | 0 | 97.5 | 0 |
| 20 | 500 | 200 | 97.5 | 97.5 |
| 40 | 250 | 200 | 97.5 | 195 |

Figure 9:
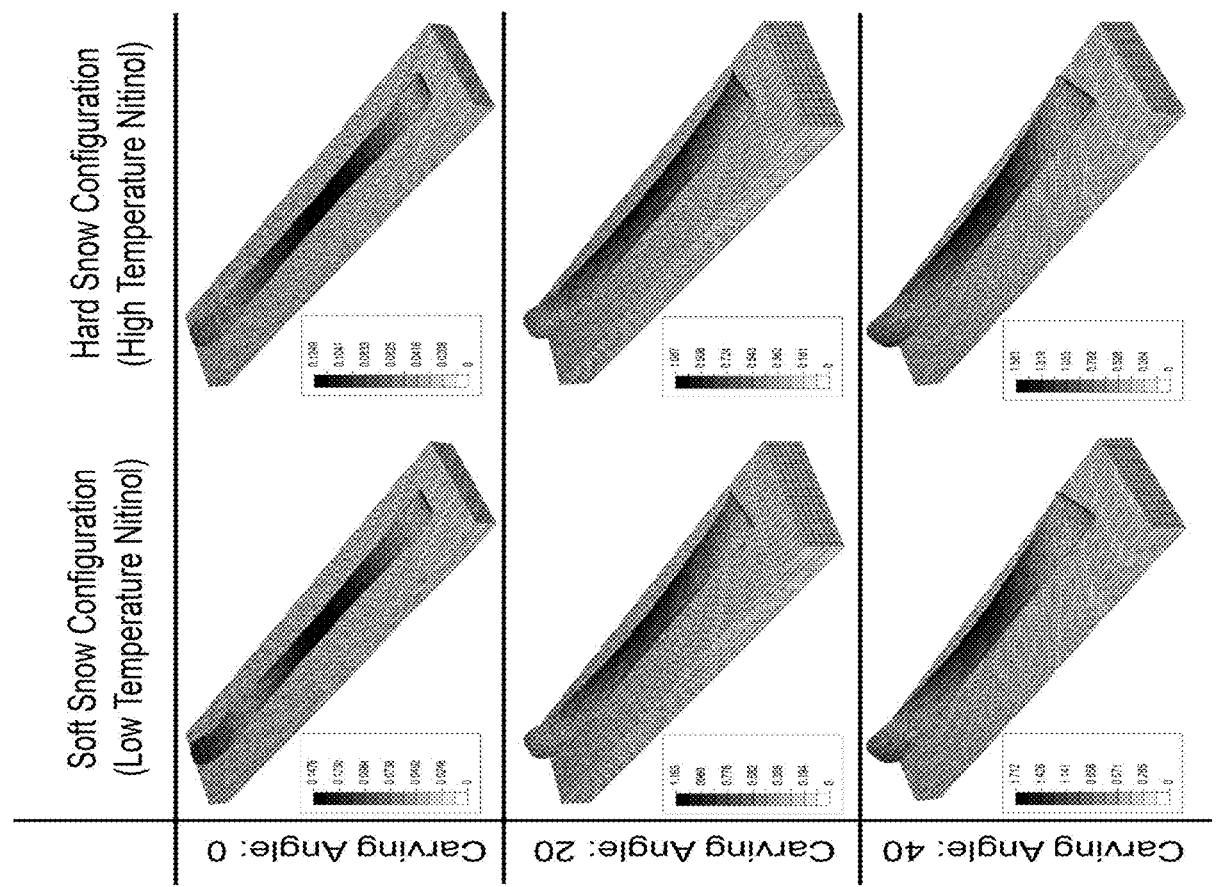
FIG. 9 shows the deflection of ski with different nitinol properties in different situations.

FE analysis is conducted to study effects of different nitinol properties on ski stiffness in different snow conditions (FIG. 9). Table 5 compares bending stiffness of soft nitinol ski on soft snow configuration with bending stiffness of stiff nitinol ski on hard snow configuration. As seen, if we increase the temperature of nitinol, the stiffness of ski will be increased by 20%, 10% and 10%, approximately for carving angles of 0°, 20°, and 40° respectively.

TABLE 5

Ski stiffness and deflection in different nitinol states

| Carving Angle (°) | Equivalent Force (lb) | Deflection (inch) | | Ski Stiffness (lb/inch) | |
|---|---|---|---|---|---|
| | | Low T | High T | Low T | High T |
| 0 | 97.5 | 0.1476 | 0.1249 | 660.57 | 780.62 |
| 20 | 137.9 | 1.163 | 1.087 | 118.57 | 126.86 |
| 40 | 218.0 | 1.712 | 1.583 | 127.34 | 137.71 |

It should be understood, of course, that the foregoing relates to exemplary embodiments of the invention and that modifications may be made without departing from the spirit and scope of the invention as set forth in the following claims.

The invention claimed is:

1. A system for adjusting a stiffness parameter of an item of sporting equipment, the item of sporting equipment comprising a front end and a back end, and the system comprising:
a torsion box embedded within the item of sporting equipment and comprised of a plurality of core elements, the plurality of core elements being formed of a thermally responsive material;
a heating element that comprises a wire-mesh embedded within the item of sporting equipment; and disposed proximate to the plurality of core elements of the torsion box, to impart a stiffness phase change in the thermally responsive material of the torsion box based on a temperature of the heating element;
a boot binding affixed to a position along the item of sporting equipment, the boot binding including a battery pack incorporated into the boot binding, the battery pack configured to provide power to the system;
a boot constructed of a mesh formed of the thermally responsive material;
a control module, in communication with a client device and the heating element to cause the system to perform operations that include:
receiving a user input via the client device, the user input defining a condition;
determining a desired stiffness parameter based on the condition defined by the user input; and
causing the heating element to impart the desired stiffness parameter to a portion of the mesh of the boot, and the plurality of core elements of the torsion box in response to the receiving the user input that defines the condition.

2. The system of claim 1, wherein the item of sporting equipment comprises an elongated body, wherein the position of the boot binding is between the first end and the second end; and the system further comprises:
a charging element to charge the battery pack.

3. The system of claim 2, wherein the item of sporting equipment further comprises an upper surface and a lower surface, and the charging element includes a solar panel disposed along the upper surface of the item of sporting equipment.

4. The system of claim 2, wherein the charging element includes a piezoelectric strip disposed along the item of sporting equipment.

5. The system of claim 1, wherein the system further comprises:
a temperature sensor to monitor a temperature of the item of sporting equipment, and to produce an output, the output including an electric signal, the electric signal being dependent upon the temperature of the item of sporting equipment; and wherein
the control module is further configured to receive the output of the temperature sensor, and wherein the stiffness parameter is based on the output.

6. The system of claim 1, wherein the heating element includes a nichrome wire embedded within the item of sporting equipment.

7. The system of claim 1, wherein the thermally responsive material includes a shape memory alloy.

8. The system of claim 1, wherein the plurality of core elements, wherein each core element among the plurality of core elements have various phase change temperatures each corresponding to a range of stiffness, and the plurality of core element portions are arranged at positions within the item of sporting equipment.

9. The system of claim 1; wherein the item of sporting equipment further comprises an upper surface and a lower surface, and the core element includes at least a top core element and a bottom core element.

10. A method for adjusting a stiffness parameter of an item of sporting equipment that comprises a front end and a back end, the method comprising:

affixing a boot binding to a position upon the item of sporting equipment, the boot binding including a battery pack incorporated into the boot binding, the battery pack configured to provide power to the item of sporting equipment and a boot mounted to the boot binding the boot constructed of a mesh formed of a thermally responsive material;

causing display of a graphical user interface at a client device in communication with the control module;

receiving a user input that defines a condition via the graphical user interface;

determining a stiffness parameter that corresponds with the condition defined by the user input;

determining a temperature value based on the stiffness parameter; and causing a heating element that comprises of a wire-mesh embedded within the item of sporting equipment to induce a phase change upon a portion of a plurality of core elements that comprise a torsion box embedded within the item of sporting equipment, and the mesh of the boot formed of the thermally responsive material based on the temperature value, the plurality of core elements arranged in at least a first layer and a second layer, and the portion of the plurality of core elements based on the stiffness parameter.

11. The method of claim 10, wherein the wire-mesh is embedded within the item of sporting equipment, and the inducing the phase change of the core element includes:

heating the wire to the temperature value, the wire being proximate to the core element.

12. The method of claim 11, wherein the method further comprises:

detecting a temperature of the item of sporting equipment;
generating an electric signal based on the temperature;
calculating a difference between the electric signal and a reference signal, the reference signal based on the stiffness parameter; and
heating the heating element based on the difference.

13. The method of claim 10, wherein the thermally responsive material includes a shape memory alloy.

14. The method of claim 10, wherein the core element is embedded within the item of sporting equipment.

15. The method of claim 10, wherein the core element comprises at least a first core element section and a second core element section; and the inducing the phase change includes:

inducing a first phase change of the first core element section and a second phase change on the second core element section, the first phase change and the second phase change based on the stiffness parameter.

16. The method of claim 10, wherein the receiving the stiffness parameter includes:

receiving a user input specifying one or more conditions; and
determining the stiffness parameter based on the one or more conditions.

17. An apparatus comprising:

an elongated body that comprises a front end and a back end;

a torsion box embedded within the elongated body and comprised of a plurality of core elements, the plurality of core elements formed of a thermally responsive material;

a heating element that comprises a wire-mesh embedded within the elongated body of the apparatus, and disposed proximate to the plurality of core elements of the torsion box to induce a phase change on the plurality of core elements based on a temperature value;

a boot binding affixed to a position along the item of sporting equipment, the boot binding including a battery pack incorporated into the boot binding, the battery pack configured to provide power to the system;

a boot constructed of a mesh formed of the thermally responsive material;

a control module, in communication with a client device and the heating element, to cause the apparatus to perform operations that include:

receiving, from the client device, a user input that defines a condition via the graphical user interface;

determining a desired stiffness parameter based on the condition defined by the user input, the desired stiffness parameter corresponding with a portion of the plurality of core elements and the mesh of the boot; and causing the wire to impart the desired stiffness parameter to at least the portion of the plurality of core elements and the mesh of the boot in response to the receiving the user input that defines the condition, the portion of the plurality of core elements based on the desired stiffness parameter.

18. The apparatus of claim 17, wherein the wire-mesh is constructed of 26 gauge nichrome wire.

* * * * *

UNITED STATES PATENT AND TRADEMARK OFFICE
CERTIFICATE OF CORRECTION

PATENT NO. : 10,493,354 B2
APPLICATION NO. : 15/409745
DATED : December 3, 2019
INVENTOR(S) : Nazarian et al.

Page 1 of 1

It is certified that error appears in the above-identified patent and that said Letters Patent is hereby corrected as shown below:

In the Claims

In Column 8, Line 4, in Claim 1, delete "equipment;" and insert --equipment,-- therefor In Column 8, Line 30, in Claim 2, delete "end;" and insert --end,-- therefor In Column 8, Line 61, in Claim 9, delete "claim 1;" and insert --claim 1,-- therefor In Column 9, Line 7, in Claim 10, delete "material:" and insert --material;-- therefor In Column 9, Line 45, in Claim 15, delete "section;" and insert --section,-- therefor Signed and Sealed this
Eighth Day of December, 2020

Andrei Iancu
*Director of the United States Patent and Trademark Office*